United States Patent [19]

Saderholm et al.

[11] Patent Number: 5,501,488

[45] Date of Patent: Mar. 26, 1996

[54] AIRBAG WITH ALTERNATE DEPLOYMENT MODES

[75] Inventors: Davin G. Saderholm, Salt Lake City; Brian M. Shaklik, Bountiful; Kirk H. Rasmussen, West Point, all of Utah

[73] Assignee: Morton International, Inc., Chicago, Ill.

[21] Appl. No.: 430,352

[22] Filed: Apr. 28, 1995

[51] Int. Cl.⁶ .......................... B60R 21/28; B60R 21/16
[52] U.S. Cl. .................................. 280/739; 280/743.1
[58] Field of Search ................... 280/739, 743.1, 280/743.2, 729, 731, 728.1, 738, 742, 730.1, 740

[56] References Cited

U.S. PATENT DOCUMENTS

| | | |
|---|---|---|
| 3,614,127 | 10/1971 | Glance . |
| 3,802,719 | 4/1974 | Brown . |
| 3,937,488 | 2/1976 | Wilson et al. . |
| 5,048,863 | 9/1991 | Henseler et al. ............ 280/743.1 |
| 5,180,188 | 1/1993 | Frantz et al. ............... 280/740 |
| 5,193,847 | 3/1993 | Nakayama ................. 280/738 |
| 5,246,250 | 9/1993 | Wolanin et al. ............ 280/739 |
| 5,253,892 | 10/1993 | Satoh ....................... 280/743.1 |
| 5,358,273 | 10/1994 | Onishi et al. ............. 280/743.1 |
| 5,405,166 | 4/1995 | Rogerson ................. 280/739 |

FOREIGN PATENT DOCUMENTS 2268128  1/1994  United Kingdom ............ 280/743.1

Primary Examiner—Margaret A. Focarino
Assistant Examiner—Peter C. English
Attorney, Agent, or Firm—George W. Rauchfuss, Jr.; Gerald K. White

[57] ABSTRACT

The invention is an airbag having two modes of deployment. In the normal mode, with a driver in the normal seated position, the airbag is fully deployed and inflated to attain its full normal reach and provide a cushion for protection of the driver in a collision. In the other mode, when a driver is too close to the airbag at the moment of collision, the airbag will deploy only to a shorter reach and thus protect the too-close driver from being forcibly pushed backwards by the airbag inflating to its full normal reach. In the mode for normal deployment an inner flap covers gas exhausting structure on the rear panel of the airbag to prevent escape of inflation gas from the airbag during inflation. But when a driver is too close to the airbag at the moment of collision the inner flap is held away from the gas exhausting structure, keeping such structure uncovered for escape of inflation gas which would otherwise fully inflate the airbag.

17 Claims, 3 Drawing Sheets

5,501,488

AIRBAG WITH ALTERNATE DEPLOYMENT MODES

FIELD OF THE INVENTION

The invention relates to improvements in airbag restraint systems for automobile passenger safety. More particularly, the invention provides an airbag having alternative deployment modes. One mode is effective in the event that a passenger or driver is out of the normal position and too close to the airbag at the instant of deployment. The other mode is effective when the driver or passenger is at the driver's normal seated position in the vehicle when the airbag is deployed.

BACKGROUND OF THE INVENTION

Driver side airbag modules are usually mounted at the hub of a steering wheel and the airbag is deployed from that hub. There have been instances when a driver, out of the normal seated position and too close to the hub of the steering wheel at the instant of deployment, would be forcibly struck and pushed backwards as the airbag expanded to its full normal reach. The invention provides airbags fitted with means for limiting the reach of deployment in the event that a resistance, e.g. an out-of-position driver, is encountered too close to the point of deployment as the airbag is deployed. In such a case the airbag will deploy and inflate to a limited extent, but only to a less than normal reach, and it may provide some cushioning for the out-of-position driver. Its reach will be less than the full reach that the airbag would otherwise attain for protection of a driver or passenger seated in the normal position and thus not forcibly strike or push backwards an out-of-position driver or passenger.

BRIEF DESCRIPTION OF THE INVENTION

An airbag embodying the invention comprises front and rear panels joined together at their edges to form an inflatable airbag, and further comprises an inner panel for regulating the deployment of the airbag to provide alternate modes of deployment as the airbag is deployed and inflated. The airbag is a part of an airbag module mounted in a vehicle. It is folded in an airbag container or housing and the mouth of the airbag is fastened to an inflator containing a gas generator or other means for rapidly producing gas to inflate the airbag. Gas produced by the gas generator enters through the mouth of the airbag to inflate the airbag. In the event of a vehicle collision, the gas generator is activated and instantly provides a quantity of gas sufficient to deploy the airbag from its container or housing and inflate the airbag to its full reach. The fully inflated airbag makes a cushion for protection of a driver thrown forward by the collision from a normal seated driver's position in the vehicle.

The outer walls of the airbag comprise front and rear panels of generally circular configuration. The front panel has no openings and it is the leading front as the airbag is deployed. As the airbag is inflated this panel advances toward the driver. The rear panel has a generally central opening which is the mouth of the airbag through which the inflation gas enters the airbag. The rear panel further comprises gas exhaust means such as vents or permeable fabric through which inflation gases can escape from the airbag, and such means may be covered or uncovered during inflation by a flap which is a part of an inner panel inside the airbag. When the flap covers the gas exhaust means on the rear panel, inflation gas from the gas generator will fully inflate the airbag. But when the gas exhaust means is uncovered for more than an instant, the inflation gas will only partly inflate the airbag and excess generated gas will escape through the uncovered gas exhaust means.

The inner panel is a concentric panel of generally the same diameter as the front and rear panels. It is located inside the airbag between the front and rear panels. It has a generally central opening which is at least as large in diameter as the center opening on the rear panel. Near the rim around the center opening of the inner panel, the inner panel is joined to the front panel along an inner concentric seam. Along a middle concentric seam of larger diameter, the inner panel is joined to the rear panel. The area on the inner panel between the middle and inner concentric seams is a concentric flap connected to the front and rear panels respectively by those two concentric stitched seams. As the airbag is being inflated, the front panel advances away from the rear panel lifting this flap away from the rear panel.

The inner panel functions both to direct the flow of inflation gas during out-of-position airbag deployments and to act as a vent mechanism during normal deployment.

The airbag further comprises flap releasing means for separating the flap from the front panel by force of the advancing front panel during normal deployment and inflation. However, during inflation, if the front panel encounters resistance to its forward deployment before the flap releasing means can function, the flap releasing means is frustrated so the flap will not separate from the front panel.

During inflation, appropriately located vents or other gas exhausting means on the rear panel, which had been covered by the flap, are uncovered as the flap of the inner panel is lifted away from the rear panel. While the gas exhausting means on the rear panel are uncovered, inflation gas from the gas generator can be exhausted from the airbag through such gas exhausting means. When there is no resistance to full deployment, only a small amount of inflation gas can escape through such gas exhausting means in the instant before the flap separates from the front panel. The flap when released is immediately pressed against the rear panel to cover the gas exhausting means. This action of the flap stops the escape of inflation gas so that enough of the inflation gas is held inside the airbag for full inflation of the airbag.

If the driver or passenger is out of position, with part of his body too close to the airbag at the moment of collision, the resistance of the body bearing against the advancing front panel prevents the front panel from advancing far enough for the flap to be released from the front panel. Thus, the flap is held away from the rear panel so the gas exhausting means on the rear panel remains open for escape of inflation gas that would otherwise fully inflate the airbag. The partially inflated airbag may provide some cushioning for the too-close driver but it will not be inflated to its full reach and so it will not propel the driver backwards. This protects the out of position driver from possible injury by being suddenly pushed backwards.

Some preferred embodiments of the invention will be described in further detail with reference to the drawings.

DETAILED DESCRIPTION OF PREFERRED EMBODIMENTS

Figure 1:
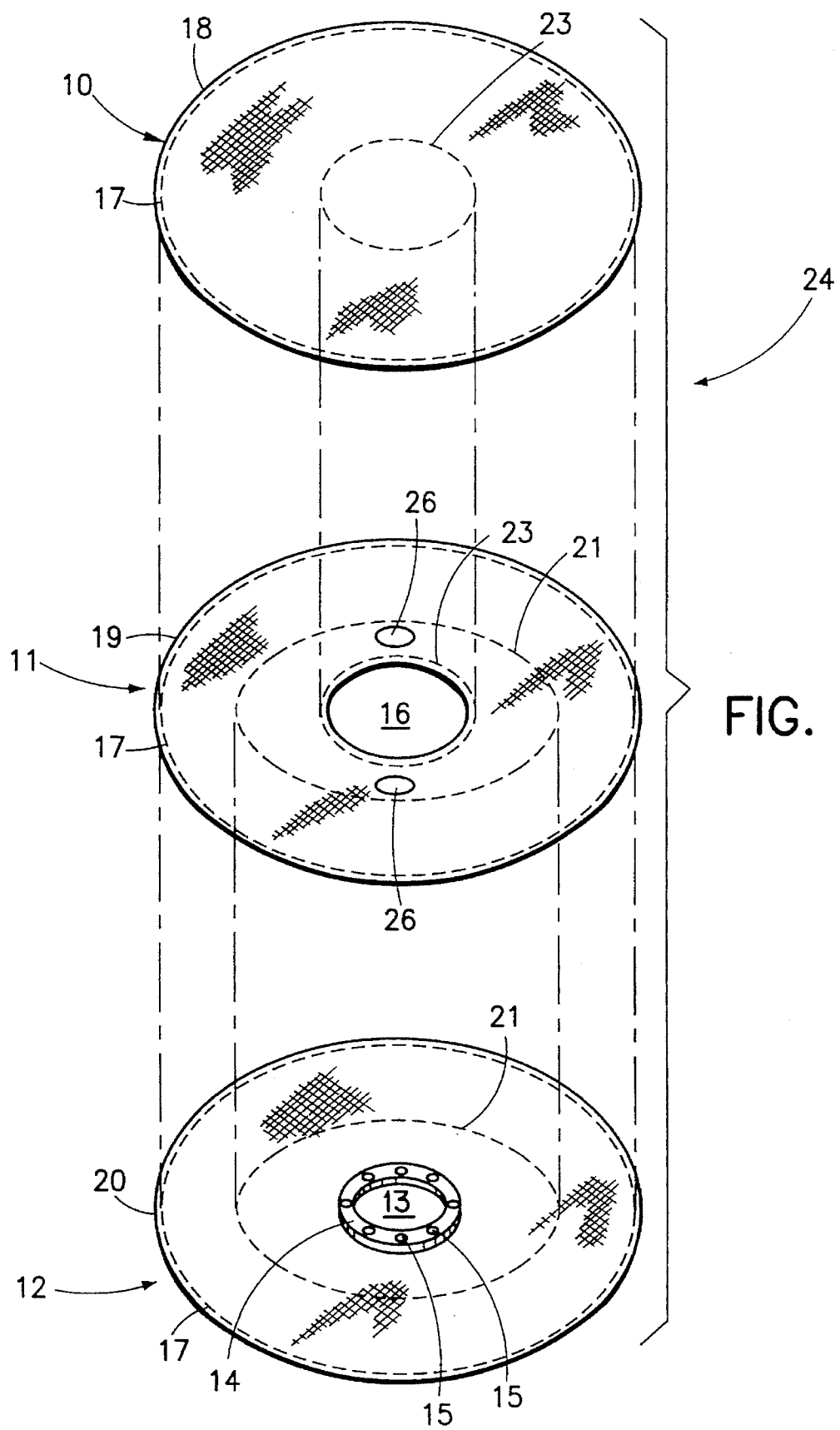
FIG. 1 is an exploded perspective view of the three panels of an uninflated and unfolded airbag embodying the invention; the panels are shown aligned on a centerline and spaced apart for purpose of illustration.

Referring now to FIG. 1 three panels of an airbag of this invention are shown, a front panel 10, an inner panel 11 and a rear panel 12. These panels are generally circular, all of the same outer diameter, and each is made of fabric suitable for its function. In this embodiment of the invention, the front panel 10 and inner panel 11 are of gas impermeable fabrics and the rear panel 12 is of a gas permeable fabric. These panels may be conventional fabrics which are known for use in airbag construction.

The front panel 10 of the airbag is a disk of fabric with no openings. The rear panel 12 is a disk of gas permeable fabric with a generally central opening defining a mouth 13 of the airbag and it is fitted with means, such as a mounting rim 14, for connecting the airbag to a gas supply means such as an inflator, not shown. The inner rim of the rear panel 12 around the mouth 13 may be reinforced with reinforcing fabric. Around the mounting rim 14 at the mouth 13 are several mounting holes 15, spaced apart, through which bolts, not shown, will extend for fastening the airbag to the outlet of the gas supply means.

The inner panel 11 of the airbag is a disk with a generally central opening 16 generally at least as large as the mouth 13 and rim 14 of the airbag so the inner panel 11 will not block the entry of inflation gas through the mouth 13 of the airbag.

Shown by dotted lines on each panel in FIG. 1 are circular seams along which the panels are connected by sewing or other suitable means. Along an outer seam 17, running just inside their peripheral edges 18, 19, and 20, respectively, all three of the panels 10, 11 and 12 are joined together by permanent, i.e. non-rupturable, stitching. Along an intermediate or middle seam 21 of lesser diameter than outer seam 17, which is spaced between the outer peripheral edges 20 and 19 and the center openings 13 and 16 in the rear panel 12 and the inner panel 11, the rear panel and inner panel are joined together with permanent, i.e. non-rupturable, stitching. This middle seam 21 on the inner panel 11 defines the outer edge of a flap 22 on the inner panel 11; the flap 22 being the area on the inner panel 11 between the middle seam 21 and the center opening 16 of the inner panel which central opening defines the inner edge of said flap. At an inner seam 23 near or adjacent the central opening 16 of the inner panel 11, the flap 22 of the inner panel is joined to the front panel 10 with releasable weak stitching at an area of the front panel overlying opening 16 of the inner panel.

Figure 2:
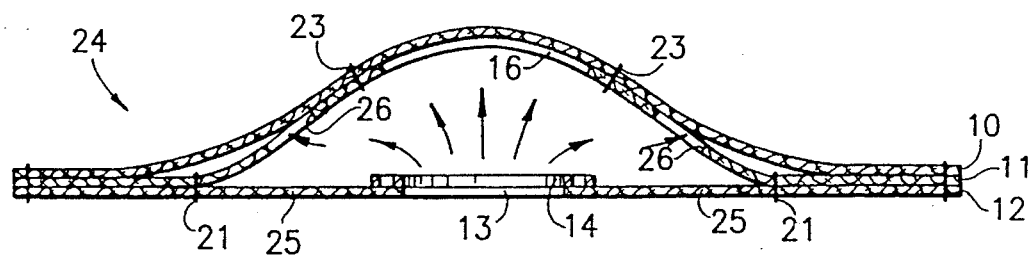
FIG. 2 is a cross section of an airbag made from the three panels, partially inflated to show the flap of the inner panel joined at concentric seams respectively to the rear panel and the front panel.

As shown in FIG. 2, as the airbag, indicated generally by reference numeral 24, is deployed and begins to inflate, the front panel 10 advances away from the rear panel 12. The inner edge of the flap 22, attached to the front panel 10 by the rupturable inner seam 23 of releasable weak stitching, is lifted away from the rear panel 12 while the outer edge of the flap remains attached to the rear panel 12 by the middle seam 21 of non-rupturable permanent stitching. The flap 22 then stretches between the two seams 21 and 23 on the front and rear panels 10 and 11 and uncovers the area 25 of the rear panel 12 between the middle seam 21 and the mouth 13 of the airbag. The uncovered area 25 of the rear panel 12 inside the middle seam 21 is of gas permeable material which, when uncovered, provides gas exhausting means for escape of inflating gas from inside the inflating airbag 24.

Figure 3:
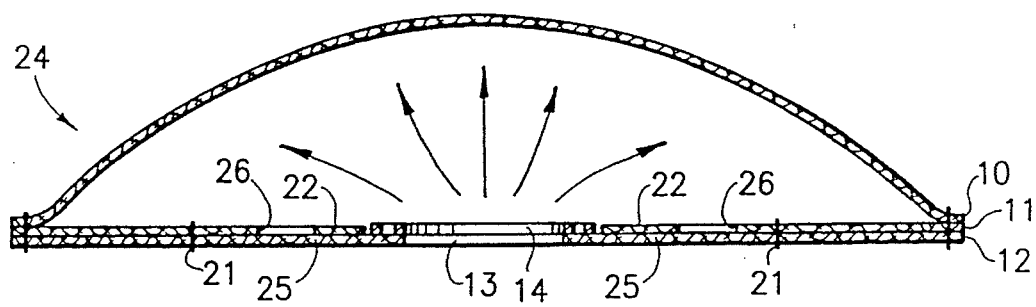
FIG. 3 is a cross section of the airbag shown in FIG. 2 but more fully inflated and with the inner panel separated from the front panel.

If the front panel 10 has not encountered some substantial resistance to its advance by the time the flap 22 has been fully stretched between the front and rear panels 10 and 12, the force of the inflating gas, indicated by the arrows, against the front panel 10 will cause the weak stitching of the releasable inner seam 23 to break and release the flap 22 from front panel 10. The flap 22 will be immediately pressed against the inside of the rear panel 12 covering area 25 as shown in FIG. 3. The front panel 10 then continues its advance to its fully inflated reach. In the period from initiation of deployment until the flap 22 breaks away from front panel 10 and returns to cover the gas exhaust means of the rear panel 12, only a small amount of inflation gas is lost through the gas exhaust means, i.e. the area 25 of air permeable fabric of the rear panel 12, leaving enough gas inside the airbag 24 to fully inflate the airbag. FIG. 3 shows the airbag fully inflated with the flap 22 broken away from the inner seam 23 and covering the gas exhaust means area 25 on the rear panel 12.

During inflation if the front panel 10 encounters resistance to its forward advance before the releasable inner seam 23 can be broken, the inner seam does not break and the gas release means, i.e. the gas permeable fabric area 25 inside the middle seam 21 on the rear panel 12, remains uncovered by flap 22 so inflation gas escapes from the airbag 24 through the gas release means rather than continuing to inflate the airbag to its fully inflated reach. Thus, a body that happens to be too close to the airbag 24 at the instant of collision will provide such resistance and will not be thrown backwards by force of the airbag inflating to its fully inflated reach.

It is preferred to have at least one flap vent, and preferably a plurality of flap vents 26 in the flap 22 so that during inflation, before the flap is separated from the front panel 10, inflation gas can pass through flap vents to inflate the space in the airbag enclosed between the front panel 10 and the inner panel 11 by means of middle seam 21 and the outer seam 17. When the flap 22 has separated from the front panel 10 and is pressed against the rear panel 12, the flap vents 26 can provide means for deflation after the airbag 24 has been fully deployed, by escape of inflation gas at a slower rate through the flap vents and the corresponding areas on the gas permeable rear panel 12 which are left uncovered by the flap vents.

Figure 5:
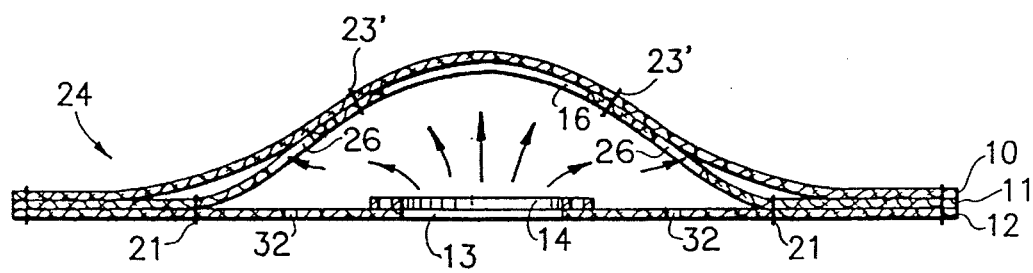
FIGS. 4–6 correspond with FIGS. 1–3 but with a rear panel made of different material and with different structure. Also the airbag has an alternative means for releasing the flap of the inner panel from the front panel.
Figure 6:
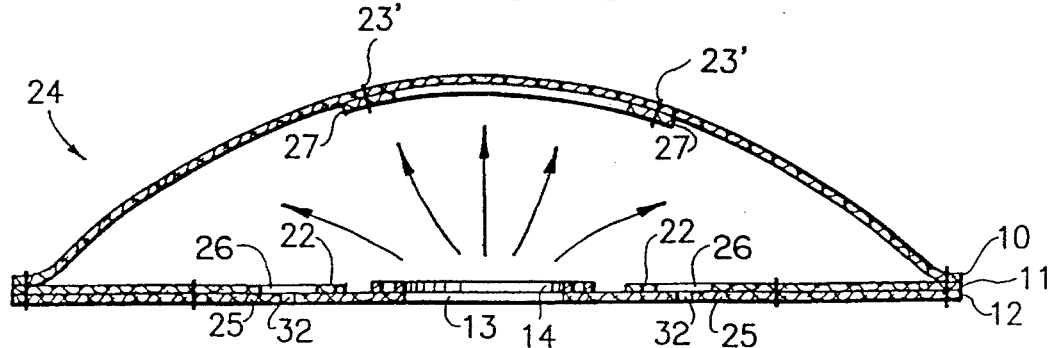
Figure 4:
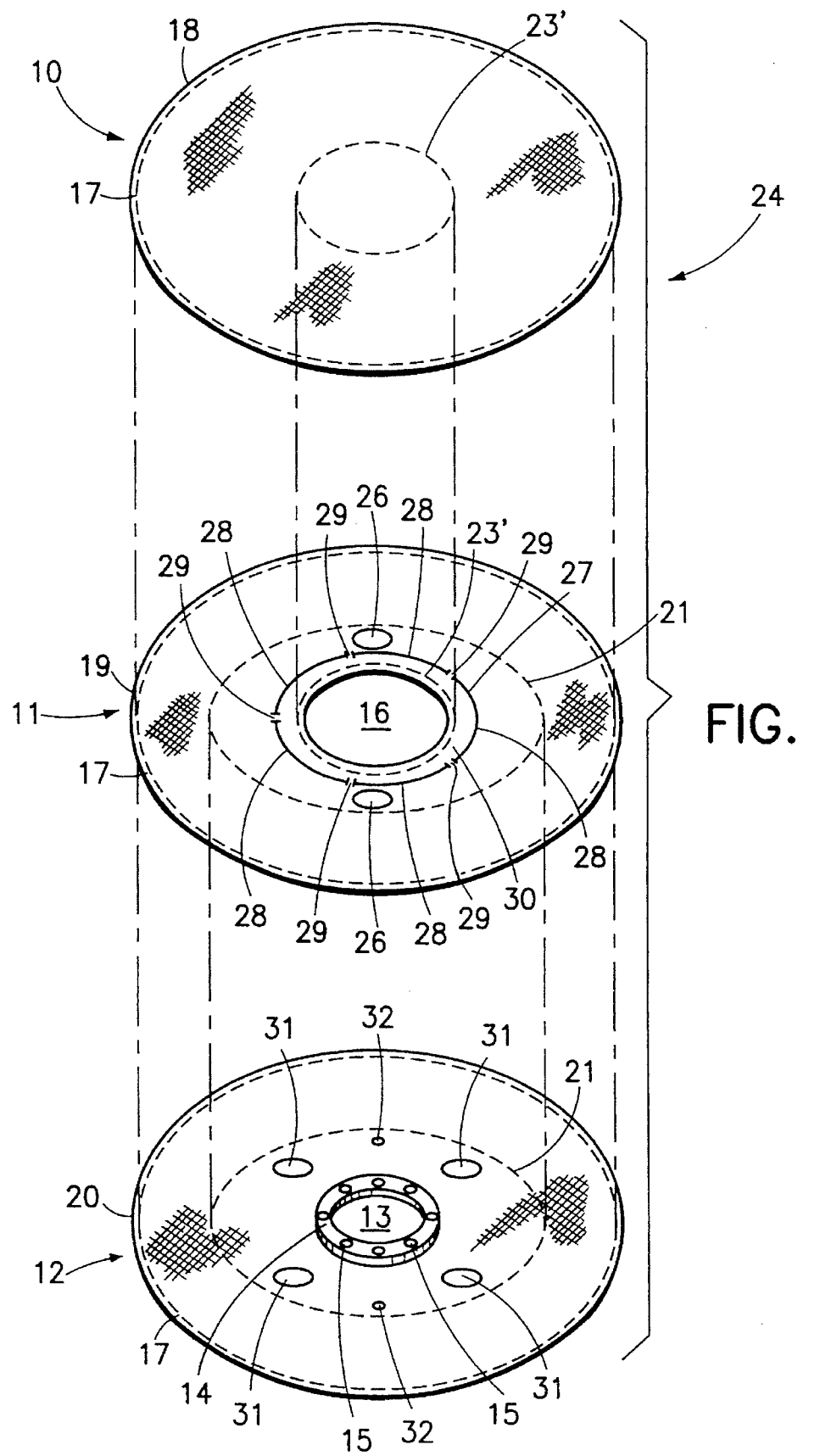

FIGS. 4–6 illustrate further embodiments of the invention having similar structure, function, and operation as the embodiment illustrated in FIGS. 1–3 described above. One embodiment differs in the structure of the flap release means, which is a weakened circle of intermittent slits in the flap, instead of weak stitching at the inner seam. It also differs in the structure of the rear panel which is made of gas impermeable fabric and has exhaust vents to provide gas exhaust means in the rear panel. These differences will be described in more detail below. Otherwise the function and operation of the airbag is the same as already described above. Reference numerals have the same meanings as those in FIG. 1 to 3.

In one variation of the invention, the flap release means may be a weakened circle 27 on the flap 22, near and just outward from the inner seam 23'. In this variation the inner seam 23' is a permanent, non-rupturable seam. The weakened circle 27 is made by cutting intermittent slits 28 in the fabric of the flap 22 around a circle, leaving uncut fabric 29 in spaces on the circle between the slits so the flap can be lifted by the front panel 10. Instead of being released by breaking a weak seam, the flap 22 will be released by tearing apart the fabric at the uncut spaces 29 on the weakened circle 27 as the unobstructed front panel 10 advances towards its full reach. Upon release from the front panel 10, the flap 22 comes to rest against the lower panel 12. Only a small circle 30 portion from the inner edge of the flap 22 will be left attached to the front panel 10 at the permanent inner seam 23'. Enough of the flap 22 is left to cover the gas exhaust means on the rear panel 12.

In another variation of the invention the rear panel 12 may be made of gas impermeable fabric and the gas exhaust means on the rear panel may be at least one exhaust vent 13 on the rear panel between the middle seam 21 and the mouth 13 of the airbag. A plurality of exhaust vents 31 on the rear panel 12 is preferred. The exhaust vents 31 on the rear panel 12 are covered by the flap 22 except while the flap is lifted away by the front panel 10. In the event that resistance to advance of the front panel 10 is met during deployment, so that the flap release means 27 is not broken after the flap 22 is lifted away from the rear panel 12, the exhaust vents 31 on the rear panel 12 are left uncovered and so they can exhaust enough inflation gas to prevent further inflation of the airbag.

The exhaust vents 31 are positioned on the rear panel 12 so as not to correspond with the flap vents 26 on the flap 22. Thus, the flap 22 can cover exhaust vents 31 on the rear panel 12 even though flap vents 26 are in the flap 18. In addition to exhaust vents 31 on the rear panel, which are provided for rapid exhaust of inflation gas when the flap release means is not broken during deployment, at least one deflation vent 32 may be provided in the rear panel 12 for deflation of the airbag following full deployment and inflation. Deflation vents 32 on the rear panel 12 correspond with flap vents 26 on the flap 22, so that the deflation vents will not be covered when the flap 22 is released from attachment to front panel 10 and comes to rest against the rear panel 12. These deflation vents 32 are sized so they will exhaust gas only at a rate that is slow enough to allow full deployment and inflation of the airbag 24 and then deflate the airbag after full inflation.

With the foregoing description of the invention, those skilled in the art will appreciate that modifications may be made to the invention without departing from the spirit thereof. Therefore, it is not intended that the scope of the invention be limited to the specific embodiments illustrated and described. The foregoing and other variations and equivalents of the invention described are within the intended scope of the invention defined by the following claims.

We claim:

1. An airbag for a vehicle occupant restraint system, said airbag comprising:

a front panel, a rear panel and an inner panel interposed between said front and rear panels, each said panel having an outer peripheral edge, all of said panels being of fabric joined together along a non-rupturable outer seam at their outer peripheral edges to define an airbag with said front and rear panels being the outer walls of the airbag and with said inner panel inside the airbag;

a generally central opening in the rear panel providing a mouth of the airbag for receiving inflation gas, a generally central opening in the inner panel at least as large as said opening in the rear panel;

said inner panel additionally being joined to the front panel along an inner seam around the central opening on the inner panel and joined to the rear panel by a non-rupturable middle seam located between said inner seam and said outer seam on the inner panel;

a flap comprising an area on the inner panel between said inner seam and said middle seam, said flap having an inner edge comprising said inner seam and an outer edge comprising said middle seam;

gas exhaust means on said rear panel between said middle seam and the mouth of the airbag;

flap release means for separating said flap from the front panel at or adjacent the inner edge of said flap during inflation of the airbag in the normal inflation mode, said separated flap covering at least a portion of the gas exhaust means on the rear panel after separation of the flap from the front panel to prevent escape of inflation gas through said covered portion gas exhaust means.

2. An airbag as claimed in claim 1 wherein the front panel and the inner panel are made of gas impermeable fabric and the rear panel is made of gas permeable fabric and the gas exhaust means on the rear panel comprises the gas permeable fabric on said rear panel between the mouth of the airbag and the middle seam.

3. An airbag as claimed in claim 2 wherein the flap release means comprises weak rupturable stitching as the inner seam joining the flap to the front panel around the central opening on said inner panel, which weak rupturable stitching will be broken by force of the advance of the front panel during normal inflation when there is no substantial resistance to the advance of the front panel.

4. An airbag as claimed in claim 3 wherein the flap comprises flap vents in the flap for passage of inflation gas through said flap vents, said vents in the flap and areas of the rear panel left uncovered by said flap vents after separating the flap during normal airbag inflation providing means for deflation of the airbag during and after full inflation of the airbag.

5. An airbag as claimed in claim 1 wherein the flap comprises flap vents in the flap for passage of inflation gas through said flap vents.

6. An airbag as claimed in claim 1 wherein the flap release means comprises weak rupturable stitching as the inner seam joining the flap to the front panel around the central opening on said inner panel, which weak rupturable stitching will be broken by force of the advance of the front panel during normal inflation when there is no substantial resistance to the advance of the front panel.

7. An airbag as claimed in claim 1 wherein the front panel, the inner panel and the rear panel are all made of gas impermeable fabric and the gas exhaust means on the rear panel comprises gas exhaust vents on said rear panel between the mouth of the airbag and the middle seam.

8. An airbag as claimed in claim 7 wherein the flap comprises flap vents in the flap for passage of inflation gas through said vents and the flap vents do not correspond with the gas exhaust vents on the rear panel so the flap covers the gas exhaust vents on the rear panel after separation of the flap from the front panel during normal airbag inflation.

9. An airbag as claimed in claim 8 wherein the rear panel further comprises deflation vents on the rear panel corresponding with the flap vents on the flap, said deflation vents being of a size to permit full inflation of the airbag when only the deflation vents are uncovered after separation of the flap from the front panel and then to provide means for deflation during and after full inflation of the airbag.

10. An airbag as claimed in claim 1 wherein the flap release means comprises a weakened fabric circle on the flap near and just outward from the inner seam, said weakened circle comprising intermittent slits in the fabric of the flap around a circle, leaving uncut fabric in spaces on the circle between the slits whereby the flap can be lifted by the front panel at initiation of airbag inflation but the flap will be separated from the front panel by tearing apart the fabric at the uncut spaces on the weakened circle as the front panel advances without significant resistance during normal inflation of the airbag leaving only a small circle from the flap attached to the front panel at the inner seam and with enough of the flap separated from the front panel to cover the gas exhaust means on the rear panel.

11. An airbag as claimed in claim 9 wherein the front panel, the inner panel and the rear panel are made of gas impermeable fabric and the gas exhaust means on the rear panel comprises gas exhaust vents in an area on said rear panel between the mouth of the airbag and the middle seam.

12. An airbag as claimed in claim 10 wherein the flap comprises flap vents in the flap for passage of inflation gas through said flap vents and the flap vents do not correspond with the gas exhaust vents on the rear panel so the flap covers the gas exhaust vents on the rear panel after separation of the flap from the front panel during normal airbag inflation.

13. An airbag as claimed in claim 11 wherein the rear panel further comprises deflation vents on the rear panel corresponding with the flap vents on the flap, said deflation vents being of a size to permit full inflation of the airbag while only the deflation vents are uncovered after separation of the flap from the front panel and then to provide means for deflation during and after full inflation of the airbag.

14. An inflatable airbag for a vehicle occupant restraint system, said airbag having two modes of deployment, one mode being normal deployment when the airbag is not obstructed by a resistance from an out-of-position vehicle occupant and a second mode being partial deployment when the airbag is obstructed by an out-of-position vehicle occupant, said airbag comprising:

superimposed front, inner and rear fabric panels each of generally circular configuration and joined together around outer peripheral edges of said panels by a non-rupturable outer seam; said front panel being the panel intended for restraining the vehicle occupant upon inflation of the airbag;

a generally central opening in the rear panel providing a mouth of the airbag for receiving inflation gas, a generally central opening in the inner panel at least as large as said opening in the rear panel;

said inner panel additionally joined to the front panel along an inner seam around the central opening on the inner panel and joined to the rear panel by a non-rupturable middle seam located between said inner seam and said outer seam on the inner panel;

a flap comprising the area on the inner panel between said inner seam and said middle seam;

gas exhaust means on said rear panel between said middle seam and the mouth of the airbag;

flap release means for separating said flap from the front panel at or adjacent the inner seam during normal deployment of the airbag and inoperative when the inflating airbag is obstructed by an out-of-position vehicle occupant, said flap when separating from the front panel covering the gas exhaust means on the rear panel to prevent escape of inflation gas through said covered gas exhaust means.

15. An inflatable airbag as claimed in claim 14 wherein the front and inner panel are made of gas impermeable fabric and the gas exhaust means in the rear panel comprises gas permeable fabric on said rear panel between the mouth of the airbag and the middle seam, said flap further comprises a flap vent in the flap and the flap release means comprises weak rupturable stitching as the inner seam, which rupturable stitching is ruptured during normal inflation of the airbag but not ruptured when inflation of the airbag is obstructed by an out-of-position vehicle occupant.

16. An inflatable airbag as claimed in claim 14 wherein the front, inner and rear panels are all made of gas impermeable fabric, the gas exhaust means on the rear panel comprises gas exhaust vents on said rear panel between the mouth of the airbag and the middle seam, said flap further comprises flap vents located on said flap so that the flap vents do not overlay said gas exhaust vents on the rear panel after separation of the flap from the front panel during normal airbag inflation and said rear panel further comprises deflation vents on the rear panel and located on said rear panel such that these deflation vents are left uncovered by the flap vents after separation of the flap from the front panel during normal airbag inflation.

17. The inflatable airbag as claimed in claim 16 wherein the flap release means comprises intermittent slits in the flap forming a weakened, tearable fabric circle on the flap near and just outward from the inner seam, said inner seam being a seam which is non-rupturable during normal airbag inflation and said weakened fabric circle tearable to separate the flap from the front panel during normal airbag inflation.

\* \* \* \* \*